US012133064B2

(12) United States Patent
Christman et al.

(10) Patent No.: US 12,133,064 B2
(45) Date of Patent: Oct. 29, 2024

(54) VIDEO AND AUDIO SPLITTING THAT SIMULATES IN-PERSON CONVERSATIONS DURING REMOTE CONFERENCING

(71) Applicant: Bank of America Corporation, Charlotte, NC (US)

(72) Inventors: Brian Christman, Richardson, TX (US); Kamal D. Sharma, Mason, OH (US); Kevin A. Delson, Woodland Hills, CA (US); Robert R. Rosseland, Charlotte, NC (US); Amer Ali, Jersey City, NJ (US); Gilbert Gatchalian, Union, NJ (US)

(73) Assignee: Bank of America Corporation, Charlotte, NC (US)

( * ) Notice: Subject to any disclaimer, the term of this patent is extended or adjusted under 35 U.S.C. 154(b) by 285 days.

(21) Appl. No.: 17/955,736

(22) Filed: Sep. 29, 2022

(65) Prior Publication Data

US 2024/0114311 A1    Apr. 4, 2024

(51) Int. Cl.
*H04S 7/00* (2006.01)
*G06F 3/16* (2006.01)
*H04M 3/56* (2006.01)
*H04S 1/00* (2006.01)

(52) U.S. Cl.
CPC ............. *H04S 7/304* (2013.01); *G06F 3/165* (2013.01); *H04M 3/568* (2013.01); *H04S 1/007* (2013.01); *H04S 2400/11* (2013.01); *H04S 2400/13* (2013.01); *H04S 2400/15* (2013.01)

(58) Field of Classification Search
CPC ...... H04S 7/304; H04S 1/007; H04S 2400/11; H04S 2400/13; H04S 2400/15; G06F 3/165; H04M 3/568
USPC .......................................................... 381/303
See application file for complete search history.

(56) References Cited

U.S. PATENT DOCUMENTS

| 10,365,711 | B2 * | 7/2019 | Fuchs | G02B 27/017 |
| 2010/0171807 | A1 * | 7/2010 | Tysso | H04N 7/147 348/14.09 |
| 2011/0268263 | A1 * | 11/2011 | Jones | H04M 3/563 379/202.01 |
| 2022/0394413 | A1 * | 12/2022 | Seipp | H04N 7/15 |

(Continued)

OTHER PUBLICATIONS

"Audio Mixing," https://en.wikipedia.org/wiki/Audio_mixing, Wikimedia Foundation, Inc., Aug. 18, 2022.

(Continued)

*Primary Examiner* — Carolyn R Edwards
*Assistant Examiner* — Friedrich Fahnert
(74) *Attorney, Agent, or Firm* — Weiss & Arons LLP

(57) ABSTRACT

Apparatus and methods for enhancing a videotelephony conference experience by generating dynamic audio channels. Audio outputs may be provided to listeners over different channels. The multiple channels may simulate live, in-person conversation with conference participants. For example, listeners may also conduct separate, private conversations with other participants of the conference without leaving the general conference conversation. The videotelephony conference interface may coordinate presentation of participants to reflect the audio channels provided to a listener. For example, actively speaking participants may be positioned in different regions of the interface.

13 Claims, 7 Drawing Sheets

(56) References Cited

U.S. PATENT DOCUMENTS

2023/0008964 A1* 1/2023 Fernandez Guajardo .................. H04L 12/1827
2023/0421701 A1* 12/2023 Griffin .................. H04M 3/567

OTHER PUBLICATIONS

"Binaural Hearing: How Our Ears Sense the Direction of Sounds," https://chomerecordingstudio.com/binaural-hearing/, E-Home Recording Studio, Retrieved on Sep. 18, 2022.
"The Direction of Sound," https://www.hear-it.org/The-direction-of-sound:~:text=Therefore%2C%20the%20sound%20waves%20must,the%20right%20of%20the%20face., Retrieved on Sep. 18, 2022.
"Sound Effect," https://en.wikipedia.org/wiki/Sound_effect, Wikimedia Foundation, Inc., Jun. 1, 2022.
"Stereophonic Sound," https://en.wikipedia.org/wiki/Stereophonic_sound, Wikimedia Foundation, Inc., Aug. 30, 2022.

\* cited by examiner

VIDEO AND AUDIO SPLITTING THAT SIMULATES IN-PERSON CONVERSATIONS DURING REMOTE CONFERENCING

FIELD OF TECHNOLOGY

This application describes apparatus and methods for simulating in-person conversations during a remotely conducted videotelephony conference.

BACKGROUND

A videotelephony conference allows users in remote locations to see and speak with each other. This enhances productivity because users feel they are part of a team and interact with other team members. However, current videotelephony conference software typically merges audio from all conference participants into a single audio stream. Accordingly, a single set of audio filters may process all conference audio and uniformly apply any audio enhancements to the audio signal transmitted on the audio channel.

Likewise, current videotelephony conference software may merge video from all conference participants into a single video channel. Accordingly, a single set of video filters may process all conference video and uniformly apply any video enhancements to all video transmitted on the single video channel. Sometimes, the audio and video data may be merged into a single data transmission channel.

Such uniform processing may provide target system efficiencies. For example, videotelephony conference software may optimize the single audio/video channel for target hardware or network requirements. For example, optimization may include achieving a target quality of service across a target network. The target quality of service may minimize gaps in the audio/video streaming/playback and increase the audio/video sampling rates. However, uniform processing may also unintentionally increase the difficulty of a conference participant to process and understand the information included in a single audio/video channel.

In the real world, humans are accustomed to easily determining a direction of sound or sights. For example, humans employ two ears (binaural hearing) that each independently capture sound waves. Differences in the sound waves captured by each ear allow humans to accurately determine direction of sound. Such differences may include time lag, wavelength and tone. The differences in the sound waves captured by each ear also allow humans to understand speech in noisy surroundings. Humans utilize differences in sound inputs received by each ear to efficiently separate sounds.

However, in the context of remote videotelephony conferencing, merging all audio and video into a single channel removes any differences that would allow a human listener to localize sound or efficiently separate sounds. Thus, conversations conducting using videotelephony conference software may sound artificial to human participants. It may also be difficult for human participants to efficiently separate sounds from different simultaneous speakers and discern what the different speakers are saying.

Additionally, current videotelephony conferencing software does not allow participants to conduct one-on-one private conversations without leaving a main conference room. Currently, when two participants wish to conduct a side-bar conversation, they must both leave the main conference room and enter a "breakout" room. While in the breakout room, the two participants will miss any subsequent conversation that occurs in the main conference room.

It would be desirable to provide audio and video content for a videotelephony conference that is easier and clearer for participants to understand. It would also be desirable to allow participants to conduct separate, private conversations with other participants while remaining in the general conference room. Therefore, it is desirable to provide systems and methods for VIDEO AND AUDIO SPLITTING THAT SIMULATES IN-PERSON CONVERSATIONS DURING REMOTE CONFERENCING.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
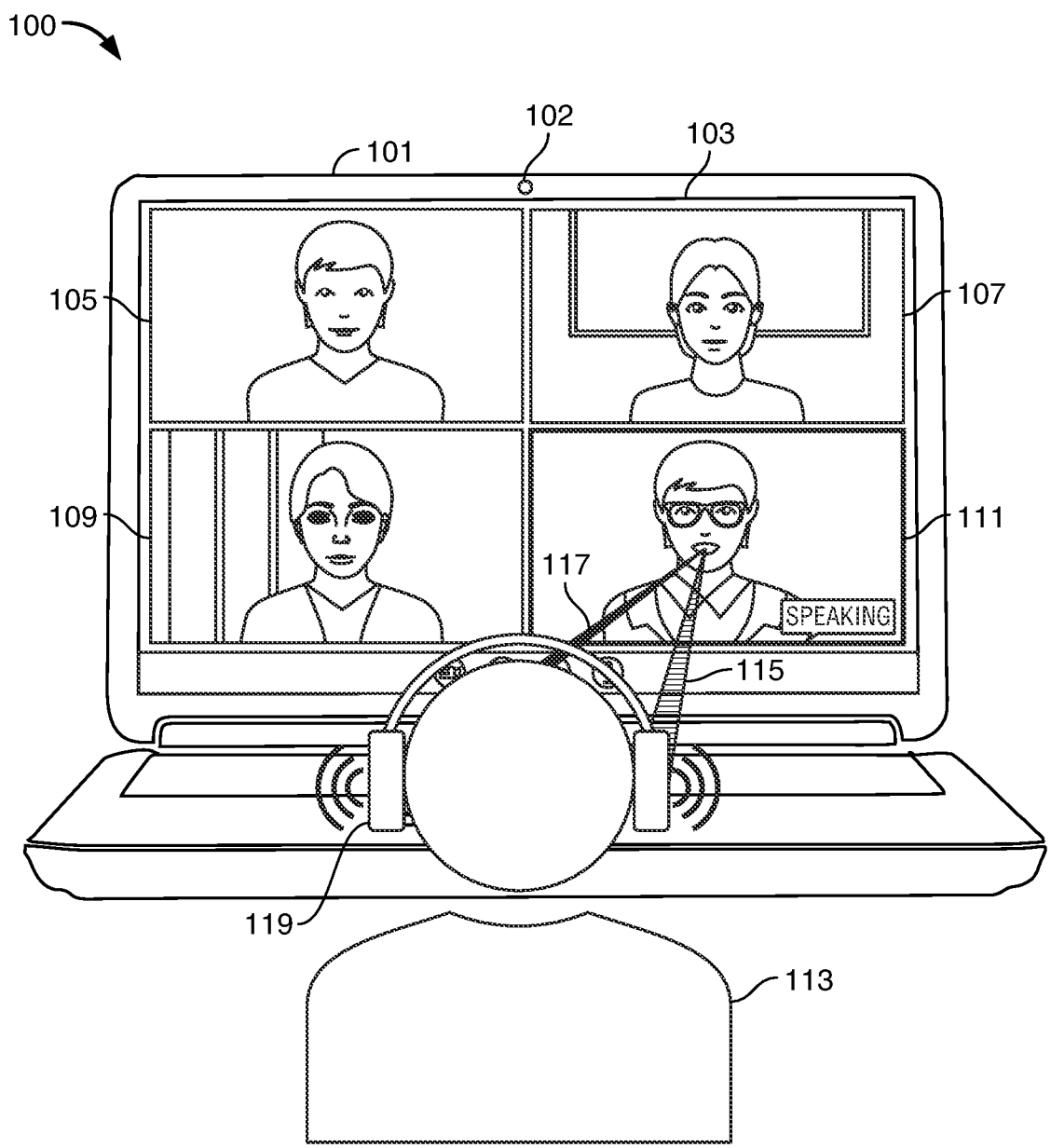
FIG. 1 shows operation of an illustrative system in accordance with principles of the disclosure.

Apparatus and methods are provided for enhancing a videotelephony conference experience by creating artificially directed video and audio streams. The artificially directed video and audio streams may include separating components of audio and video input signals into different channels. The different channels may be streamed to a conference participant in a manner that simulates live, in-person conversation. Simulating live, in-person conversation may provide more clarity and better understood conversations to conference participants. The different channels may allow two or more participants to conduct separate, private conversations with each other while remaining exposed to a general conference discussion.

An illustrative system may include a videotelephony conferencing interface. The interface may allow multiple participants to join a videotelephony conference. During the conference, multiple participants may simultaneously engage in conversation. The interface may position each actively speaking participant in different region of the interface. The interface may compartmentalize audio and video signals associated with each active participant so that other conference participants are provided with an audio/video experience that mimics live, in-person conversation.

The interface may allow two or more participants to initiate a private conversation with each other or other participants. All participants, including those engaged in private conversations, may remain in a general conference room, and will not be moved to a breakout room. When a private conversation is initiated, the interface may split audio/video streams associated with participants in the private conversation and provide a customized video/audio experience to each of those participants.

A participant may select whether to direct their audio/video input to the private conversation or the general conference. A participant may select how their audio/video input should be directed to a target participant. For example, a first participant may select whether a second participant perceives audio input of the first participant and emanating from behind or to the right of the second participant. The apparatus and methods described herein may simulate live, in-person visual and audio experience for participants in a videotelephony conference.

In some embodiments, a participant's audio input may be directed to either the private conversation or to the larger conference room. When engaged in a private conversation, a default setting may cause audio input to only be directed to participants in the private conversation. Any of the participants in the private conversation may press a button within the interface or a keyboard shortcut to force microphone audio input to be shared with the larger conference room.

Methods for simulating an in-person audio conversation during a videotelephony conference are provided. Methods may include detecting a first audio input provided by a first participant. Methods may include detecting a second audio input provided by a second participant. Methods may include positioning the first participant in a first region of a video conference interface presented to a listener. The listener may be another conference participant. The methods may include positioning the second participant in a second region of the video conference interface.

Methods may include adjusting an audio output provided to the listener based on positions of the first and second participants in the video conference interface. Differences in the audio outputs may include providing different signals to each ear of the listener. The audio signals may differ in a time lag, wavelength and tone. Differences in audio signals may be artificially created to trigger a desired perception by the listener. The desired perception may include a position of a speaker, cause a listener to face a speaker, or perceive a speaker as being closer or further away from the listener.

For example, the methods may include positioning the first participant in an upper right corner of a display presented to the listener. The methods may include positioning the second participant in a lower left corner of the display. When the first participant speaks, the audio stream presented to the listener may cause the listener to perceive that the first participant is positioned to the right of the listener. When the second participant speaks, the audio stream presented to the listener may cause the listener to perceive that the second participant is positioned to the left of the listener.

Adjusting the audio output provided to the listener may include outputting the first audio input received from the first participant through a first audio channel. Adjusting the audio output provided to the listener may include outputting the second audio input received from the second participant through a second audio channel. The first audio input may be streamed through the first audio channel at a first volume. The second audio input may be streamed through the second audio channel at a second volume. For example, the first volume may be louder than the second volume.

The difference in volume may cause the listener to perceive audio signals associated with the first and second participants as emanating from different directions or locations. The different locations may be locations of the participants within a videotelephony conference interface. The different location may be locations may be relative to a current position of the listener with respect to the videotelephony conference interface.

For example, the first volume may be based on the positioning of the first participant in the first region of the videotelephony conference interface. The second volume may be based on the positioning of the second participant in the second region of the videotelephony conference interface. The first and second volumes, when output to the listener may cause the listener to perceive the first participant as being positioned to the right or left of the listener. The first and second volumes, when output to the listener may cause the listener to perceive the first participant as being positioned to the right or left of each other.

Methods may include adjusting the audio output provided to the listener based on a detected position of the listener with respect to the video conference interface. The position of the listener may include an orientation of the listener with respect to the display. For example, a listener that is facing toward the display may receive a first audio signal. If the listener is turned away from the display, the listener may receive a second audio signal.

The adjusting of the audio output may cause the listener to perceive sound based on whether the listener is positioned above or below the interface. The adjusting is further based on an estimated distance of the listener from a display presenting the video conference interface. The adjusting may cause the listener to perceive sound that corresponds to a distance of the listener from the display.

The adjusting of the audio output may cause the listener to perceive audio signals associated with the first and second participants as emanating from different directions, at different volumes or having any suitable auditory effect. Other illustrative auditory effects may include equalization, balance, amplification, echo, pitch shift, time stretching, level compression or any other suitable auditory effects.

The adjusting of the audio output may include dynamically mixing a first audio output based on the first and second audio inputs. The adjusting may include dynamically mixing a second audio output based on the first and second audio inputs. The mixing may blend multiple audio inputs into one or more output streams or channels. The adjusting may include outputting the first audio output to the listener through a first audio channel. The adjusting may include outputting the second audio output to the listener through a second audio channel.

Methods may include detecting a third audio input from the listener. For example, the listener may respond to a question or comment posed by the first participant. In response to the third audio input, methods may include remixing the first and second audio outputs.

Methods may include repositioning a video feed of one or more participants presented within the videotelephony conference interface. For example, if a listener is engaged in a private conversation with a target participant, the video feed of the target participant may be highlighted (e.g., "spotlighted") or moved to a target region within the interface. The highlighting may signify that the listener and target participant are engaged in a private conversation. When conducting a private conversation, audio of the listener and target participant may not be shared with other conference participants.

Methods may include moving or resizing the video feed of the target participant within the interface. For example, if a listener is engaged in a private conversation with a target participant, the video feed of the target participant may be moved to a specific region of the interface. The repositioning of the video feed in the specific region may indicate that that listener and target participant are engaged in a private conversation. The video feed of the target participant may be resized. The resizing may increase a size for the target participant relative to other conference participants. The resizing may decrease a size of the target participant's video feed relative to other conference participants.

Methods may include rearranging or resizing all participants displayed within the interface. The rearranging or resizing may indicate that the target participant and listener are engaged in a private conversation within an ongoing background conversation among other conference participants. Methods may include repositioning a video feed of a target participant within the videotelephony conference interface in response to listener input. A listener may relocate a video feed of a target participant to any desired location within the interface. A listener may select to relocate their own video feed displayed to target participant.

An artificial intelligence ("AI") engine for dynamically adjusting an audio output streamed to a listener during a video conference is provided. The AI engine may include machine executable instructions (which may be alternatively referred to herein as "computer instructions" or "computer code"), stored in a non-transitory memory of a computer system.

An illustrative computer system may be a workstation, desktop, laptop, tablet, smartphone, or any other suitable computing device. The computer system may be used to implement various aspects of the systems and methods disclosed herein. The computer system may have a processor for controlling the operation of the computer system and its associated components.

The processor may include one or more integrated circuits which includes logic configured to process executable instructions associated with an application. The processor may compute data structural information and structural parameters of the data. The computer system may include two or more processors.

Components of the computer system may include RAM, ROM, input/output ("I/O") devices, and a non-transitory or non-volatile memory. Machine-readable memory may store information in machine-readable data structures. The processor may also execute software running on computer system. Other components commonly used for computers, such as EEPROM or flash memory or any other suitable components, may also be part of the computer system.

The non-transitory memory may be comprised of any suitable permanent storage technology—e.g., a hard drive. The non-transitory memory may store software including an operating system and application program(s) along with any data needed for the operation of the computer system. Non-transitory memory may also store videos, text, and/or audio files. The data stored in the non-transitory memory may also be stored in cache memory, or any other suitable memory. For example, data may temporarily be stored in ROM or RAM.

Application program(s) may include computer executable instructions (alternatively referred to as "programs"). The computer executable instructions may be embodied in hardware or firmware (not shown). The computer system may execute the instructions embodied by the application program(s) to perform various functions. Application program(s) (which may be alternatively referred to herein as "plugins," "applications," or "apps") may include computer executable instructions for invoking functionality related to performing various tasks.

Application program(s) may utilize the computer-executable instructions executed by a processor. Generally, programs include routines, programs, objects, components, data structures, etc., that perform particular tasks or implement particular abstract data types. Application program(s) may utilize one or more algorithms that process received executable instructions, perform power management routines or other suitable tasks. Illustrative AI computational algorithms utilized by the AI engine may include AdaBoost, Naive Bayes, Support Vector Machine, Random Forests, Artificial Neural Networks and Convolutional Neural Networks. Application program(s) may utilize one or more AI systems and models described herein.

Application program(s), which may be used by the computer system, may include computer executable instructions for invoking functionality related to communication, such as e-mail, Short Message Service (SMS), and voice input and speech recognition applications.

I/O devices may include a microphone, keyboard, touch screen, mouse, and/or stylus through which input signals may be provided into the computer system. Illustrative input signal may include audio generated by a conference participant or video of the conference participant. The I/O devices may also include one or more speakers for providing audio output and a video display device for providing textual, audio, audiovisual, and/or graphical output.

The computer system may be connected to other systems via a local area network ("LAN") interface. Computer system may operate in a networked environment supporting connections to one or more remote computers. Remote terminals may be personal computers or servers that include many or all of the elements described in connection with the computer system. Illustrative network connections may also include a wide area network ("WAN"). When used in a LAN networking environment, the computer system may be connected to a LAN through a LAN interface or an adapter. When used in a WAN networking environment, the computer system may include a modem, antenna or other hardware for establishing communications over WAN to a remote network such as the Internet.

The computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

It will be appreciated that the network connections described are illustrative and other means of establishing a communications link between computer systems may be used. The existence of various well-known protocols such as TCP/IP, Ethernet, FTP, HTTP and the like is presumed, and the computer system can be operated in a client-server configuration to permit retrieval of data from a web-based server or application programming interface ("API"). Web-based, for the purposes of this application, is to be understood to include a cloud-based system. A web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Components of the computer system may be linked by a system bus, wirelessly or by other suitable interconnections. Components of computer system may be present on one or more circuit boards. In some embodiments, the components may be integrated into a single chip. The chip may be silicon-based.

The computer system may be a portable device such as a laptop, cell phone, tablet, smartphone, or any other computing system for receiving, storing, transmitting and/or displaying relevant information. The computer system may be operational with numerous other general purpose or special purpose computing system environments or configurations. Examples of well-known computing systems, environments, and/or configurations that may be suitable for use with this disclosure include, but are not limited to, personal computers, server computers, hand-held or laptop devices, tablets, mobile phones, smart phones and/or other mobile devices, multiprocessor systems, microprocessor-based systems, cloud-based systems, programmable consumer electronics, network PCs, minicomputers, mainframe computers, distributed computing environments that include any of the above systems or devices, and the like.

The AI engine, when executed by the processor on the computer system may capture audio input from two or more participants in a videotelephony conference. Based on input provided by a listener, the AI engine may mix the audio input to generate a first audio output and a second audio output. The input provided by the listener may include selecting at least one of the two or more participants to engage in a one-on-one conversation.

The listener may select one of the two or more participants to engage in a one-on-one conversation by inputting a first selection on the user interface. The listener may select one of the two or more participants by pressing a command key, selecting a prespecified icon on the user interface, or by any other suitable user input medium. The listener may select one or more of the two or more participants to engage in a private conversation.

The listener may re-engage with the general conference by inputting a second selection on the user interface. The listener may selectively toggle between a private conversation and the general conference. When engaged in a private conversation video and/or audio input of the listener may not be shared with the other participant in the general conference. When engaged in a private conversation video and/or audio input of the target participant may not be shared with the other participant in the general conference.

The listener may re-engage with the general conference by pressing a command key, a prespecified icon on the user interface, or by any other suitable input. The listener may be re-engaged in the general conference if there is no detectable audio input from the listener or target participant within a prespecified window of time. The listener may automatically be re-engaged into the general conference if no audio input is detected within the prespecified window of time.

The AI engine may present the first audio output to the listener through a first audio channel. The AI engine may present the second audio output to the listener through a second audio channel. The AI engine may include machine executable instructions stored in the non-transitory memory that when executed by the processor on the computer system, align a visual position of the two or more participants presented to the listener. The AI engine may align the position of the participants based on a proportion of the audio input captured from each of the two or more participants in the first audio output or the second audio output.

The AI engine may include machine executable instructions stored in the non-transitory memory that when executed by the processor on the computer system, mix the captured audio input to minimize a target audio input captured from a target participant within the first audio output and the second audio output. Minimizing the target audio input may enhance an ability of the listener to discern the first and second audio outputs.

The AI engine may include machine executable instructions stored in the non-transitory memory that when executed by the processor on the computer system, mix the captured audio input to maximize, within the first audio output and the second audio output, a target audio input captured from a target participant. Maximizing the target audio input may enhance an ability of the listener to discern the target audio input.

The AI engine may include machine executable instructions stored in the non-transitory memory that when executed by the processor on the computer system mix the captured audio input to generate the first audio output and the second audio output that focuses the listener on a target location of the screen displaying the first and second participants. Focusing on a target location may include causing the listener to make eye contact with the target location.

The AI engine may mirror audio output generated for the target participant to focus on audio input captured from the listener. For example, if the AI engine determines that the listener is engaged in a private conversation with the target participant, the AI engine may adjust the audio output provided to the target participants so that the target participant also perceives a private conversation with the listener.

The AI engine may generate a first audio output and a second audio that causes the listener to focus on a target audio input captured from a target participant by presenting the target audio input to the listener via a first channel and audio input captured from any of the other two or more participants via a second channel.

An artificial intelligence ("AI") engine for dynamically adjusting audio output provided to a listener during a videotelephony conference is provided. The AI engine may include machine executable instructions stored in a non-transitory memory of a computer system. The instructions, when executed by a processor on the computer system may cause the computer system to implement various functions.

The functions may include capturing a first audio input from a first participant in the videotelephony conference. The functions may include capturing a second audio input from a second participant in the videotelephony conference. The functions may include presenting a first mix of the first audio input and the second audio input to the listener over a first audio channel. The functions may include presenting a second mix of the first audio input and the second audio input to the listener over a second audio channel. The first mix and the second mix may be generated by the AI engine based on relative positions of the first and second participants displayed to the listener via a user interface of the videotelephony conference.

The AI engine may receive a selection of the first participant. The selection may be received from the listener. In response to the selection, the AI engine may adjust the first mix and the second mix such that the first audio input captured from the first participant dominates the first mix presented over the first channel and the second mix presented over the second channel.

The AI engine may receive a selection of the listener by the second participant. In response to the selection, the AI engine may adjust the first mix and the second mix such that the second audio input captured from the second participant dominates the first mix presented to the listener over the first channel and the second mix presented to the listener over the second channel.

The AI engine may receive a selection from a listener that wishes to initiate a private conversation with a target participant. In response to the selection, the AI engine may relocate, resize or otherwise highlight a video feed of the target participant within a user interface displayed to the listener. The AI engine may relocate, resize or otherwise highlight a video feed of the listener displayed to the target participant to indicate, within the interface displayed to the target participant, that the target participant is engaged in a private conversation with the listener.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative operative scenario 100. Scenario 100 shows that listener 113 is using computer system 101 to participate in a videotelephony conference. The videotelephony conference is presented to listener 113 on interface 103.

Interface 103 includes a display of other conference participants including participants 105, 107, 109 and 111. Interface 103 shows that participant 111 is currently speaking. An audio output that includes left audio signal 117 and right audio signal 115 is provided to listener 113. In Scenario 100 listener 113 is wearing headset 119 that receives, and outputs left audio signal 117 and right audio signal 115. An AI engine may generate left audio signal 117 and right audio signal 115.

For example, scenario 100 shows that participant 111 is positioned in a lower-right corner of interface 103. Scenario 100 also shows that three other participants (103, 105 and 109) are also in the conference. Scenario 100 also shows that left audio signal 117 and right audio signal 115 are different (noted in FIG. 1 by differences in shading).

An AI engine may generate the different right/left audio signals to provide listener 113 with an experience that mimics a live, in-person conversation between participant 111 and listener 113. In a real, live conversation, because of the relative positions of participant 111 with respect to listener 113, each of listener 113's ears would receive different audio signals from participant 111. Such differences may include time lag, wavelength and tone.

During a live, in-person conversation, the differences in the audio signal captured by each of listener 113 ears would allow the listener 113 to accurately determine a location of participant 111. During a live, in-person conversation, the differences in the sound waves captured by each of listener 113 ears would also allow listener 113 to understand speech of participant 111 in a noisy environment. During a live, in-person conversation, listener 113 utilizes differences in sound signals received by each ear to efficiently separate sounds.

During a videotelephony conference, an AI engine may generate audio signals that simulate audio signals that would have been received by each ear of listener 113 during a live, in-person conversation with participant 111. For example, because participant 111 is positioned in a lower-right corner of interface 103, the volume of right audio signal 115 may be higher than the volume of left audio signal 117. Right audio signal 115 may have less of a time lag than left audio signal 117. The AI engine may generate right audio signal 115 and left audio signal 117 to provide listener 113 with the experience of a live, in-person conversation with another located to the right of listener 113.

Figure 2:
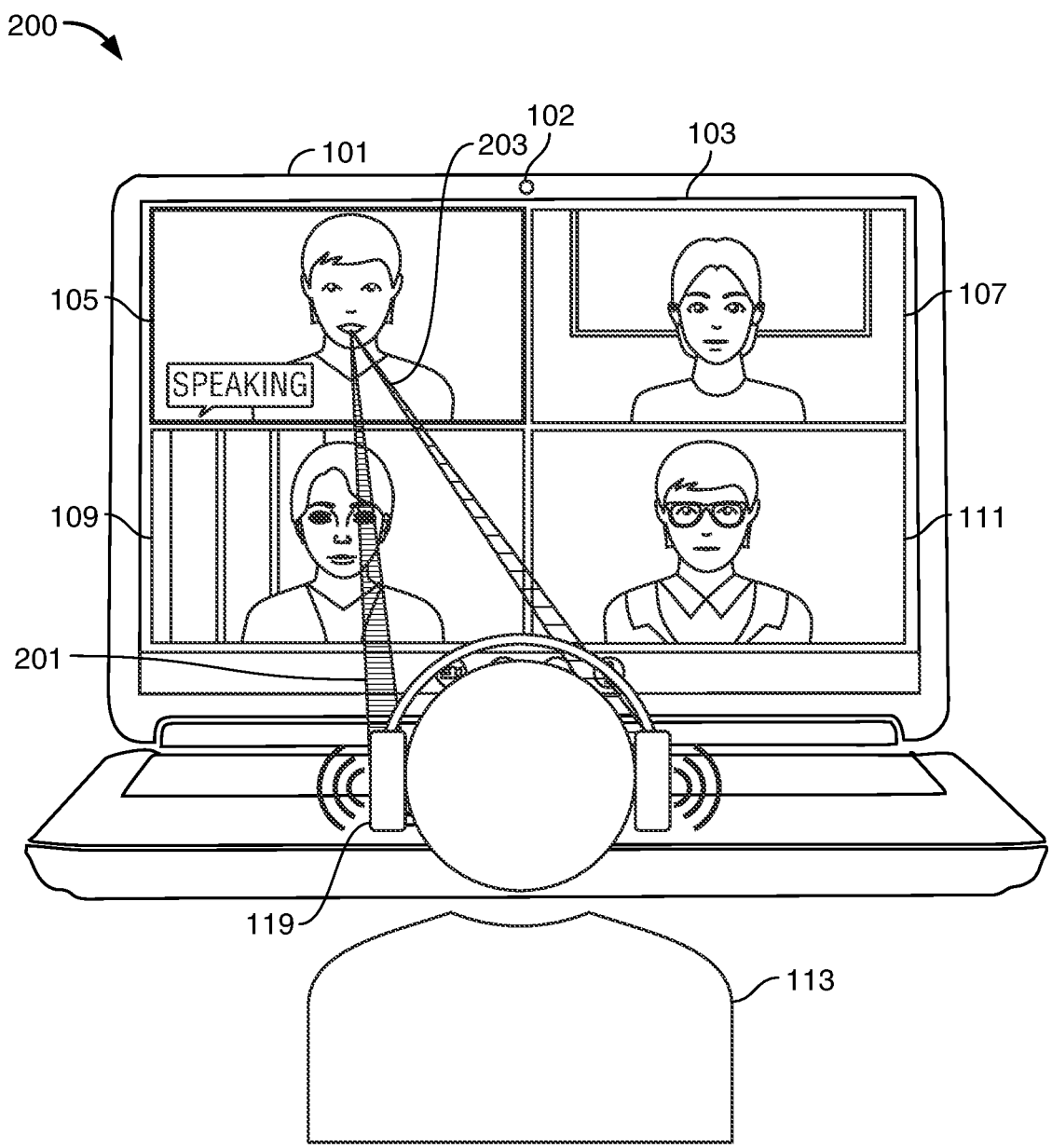
FIG. 2 shows operation of an illustrative system in accordance with principles of the disclosure.

FIG. 2 shows illustrative operative scenario 200. Scenario 200 shows that participant 105 is now speaking. Scenario 200 shows that participant 105 is positioned in an upper-left corner of interface 103. Scenario 200 shows that an AI engine has generated left audio signal 201 and right audio signal 203. Scenario 200 shows that left audio signal 201 and right audio signal 203 are different (noted in FIG. 2 by differences in shading).

The AI engine may generate left audio signal 201 and right audio signal 203 to simulate a live, in-person conversation between participant 105 and listener 113. Scenarios 100 and 200 show that the AI engine may dynamically adjust audio signals provided to listener 113 based on which participant is currently speaking and a location of the speaker within interface 103. In some embodiments, the AI engine may generate the audio signals based on a location of listener 113 relative to interface 103 and/or the speaker.

Figure 3A:
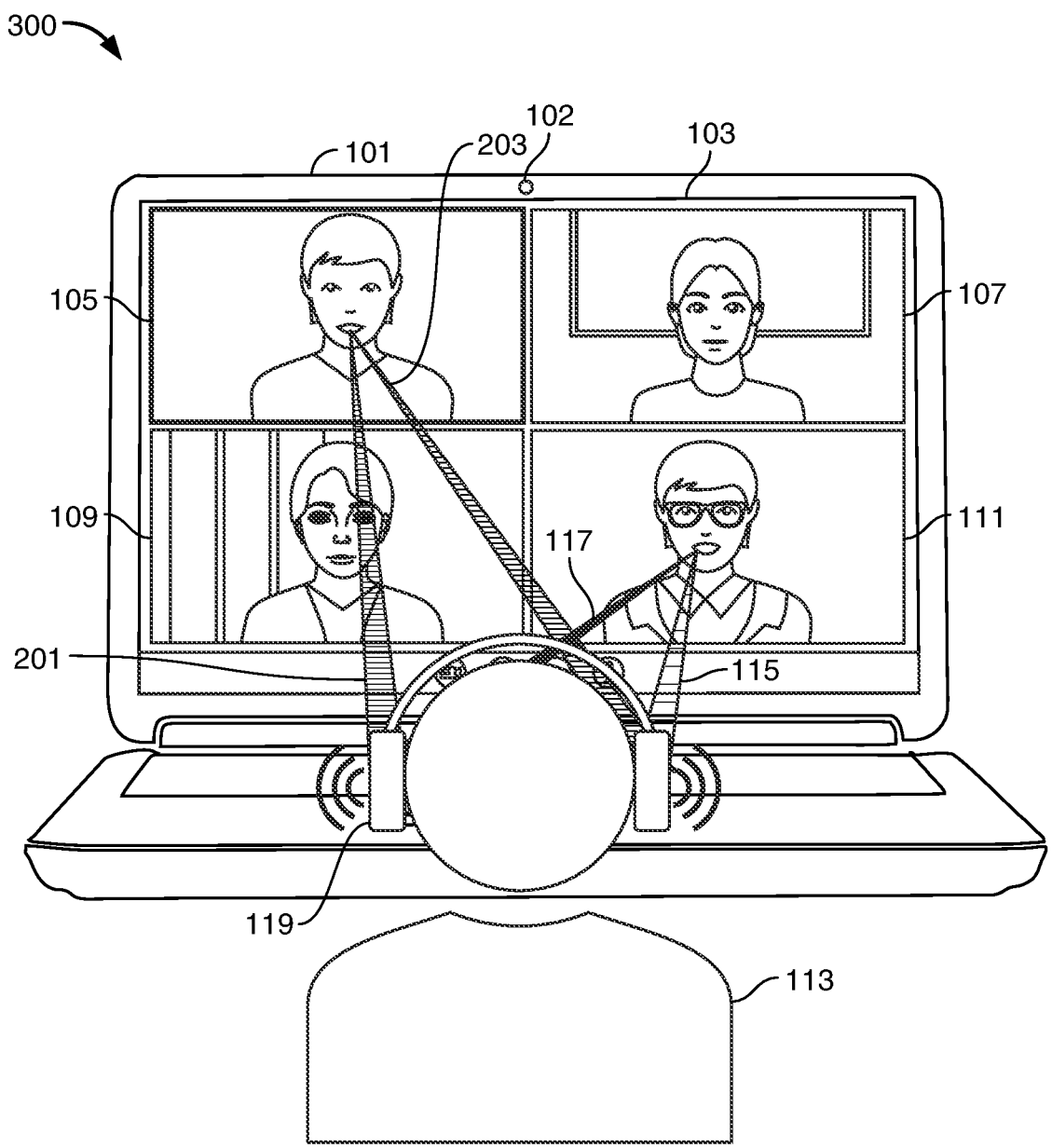
FIG. 3A shows operation of an illustrative system in accordance with principles of the disclosure.

FIG. 3A shows illustrative operative scenario 300. In scenario 300 participants 105 and 111 are speaking simultaneously. During a live, in-person conversation, the differences in the sound waves captured by each of listener 113 ears would also allow listener 113 to understand speech of participant 111 despite concurrent speech of participant 105. During a live, in-person conversation, the differences in the sound waves captured by each of listener 113 ears would also allow listener 113 to understand speech of participant 105 despite concurrent speech of participant 111.

During a live, in-person conversation, the differences in the sound waves captured by each of listener 113 ears would also allow listener 113 to simultaneously understand both participant 111 and participant 105. During a live, in-person conversation, listener 113 utilizes differences in sound signals received by each ear to efficiently separate the speech of both participant 111 and participant 105.

Scenario 300 shows that an AI engine may dynamically mix left audio signal 201 (received from participant 105) and left audio signal 117 (received from participant 111). The dynamic mixing may blend left audio signals 201 and 117 to simulate live, in-person simultaneous speech of participants 105 and 111. The dynamic mixing may account for variations in the audio signals based on correlating relative positions of participants 105 and 111 within interface 103 to physical differences in location between participants 105 and 111. The dynamic mixing may account for variations in the audio signals based on correlating relative positions of participants 105 and 111 within interface 103 to physical differences in location between participant 105, participant 111 and listener 113.

The dynamic mixing may minimize a target audio signal (e.g., left audio signal 117) captured from a target participant (e.g., participant 111). Minimizing the target audio signal may enhance an ability of listener 113 to discern another audio signal (e.g., left audio signal 201 received from participant 105).

The AI engine may mix the captured audio input to maximize a target audio signal (e.g., right audio signal 115) captured from a target participant (e.g., participant 111). Maximizing the target audio input may enhance an ability of the listener to discern the target audio input (e.g., right audio signal 115 received from participant 111).

In response to a selection received from listener 113, the AI engine may dynamically adjust mixing of audio signals. For example, listener 113 may select a target participant. Based on the selection of listener 113, the AI engine may determine whether to dynamically minimize, maximize or apply any other any suitable auditory effect to audio signals generated by the selected participant.

Figure 3B:
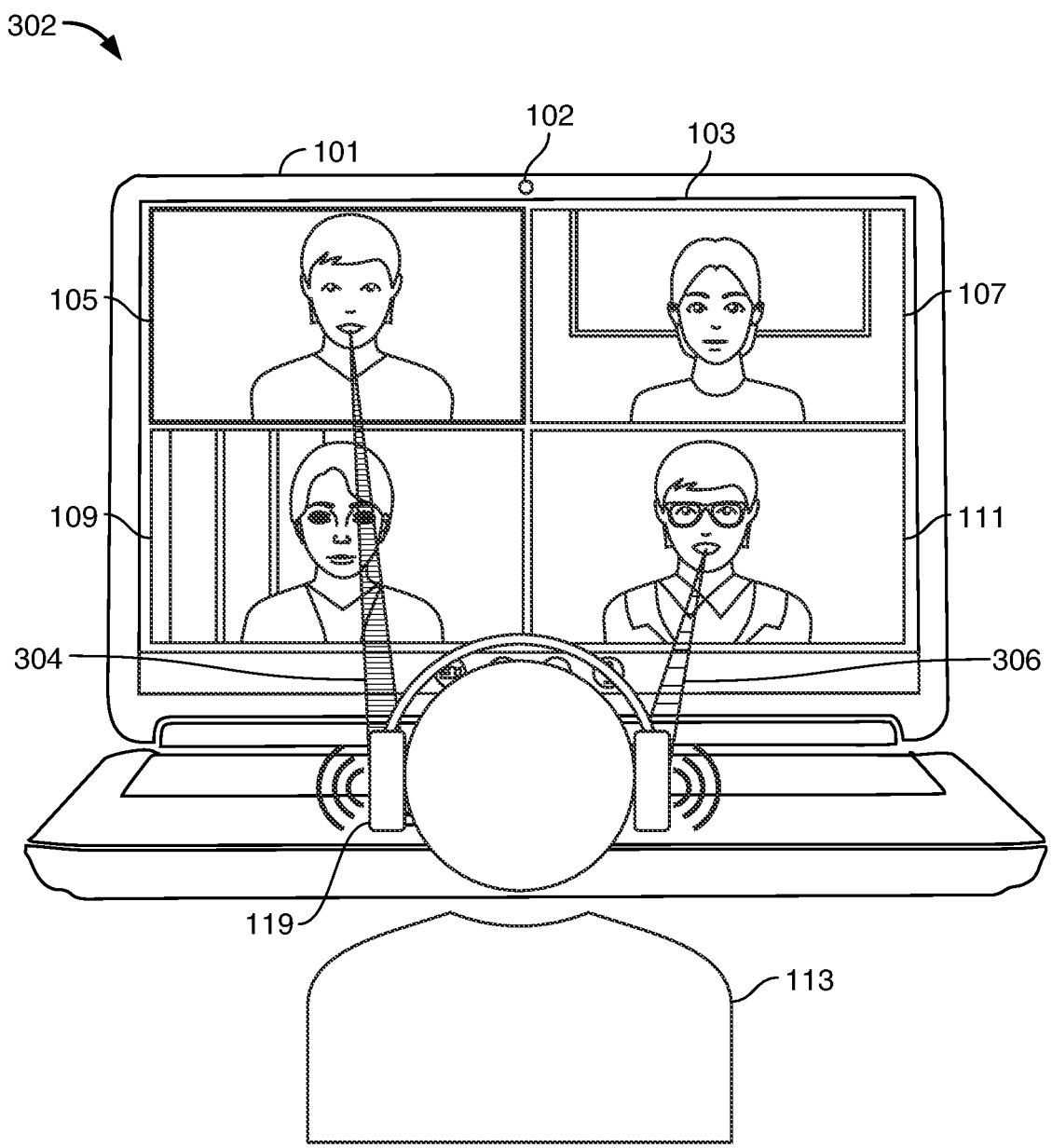
FIG. 3B shows operation of an illustrative system in accordance with principles of the disclosure.

FIG. 3B shows illustrative operative scenario 302. In scenario 302, the AI engine has mixed left audio signals 117 and 201 (shown in FIG. 3A) to create composite left audio signal 304. Composite left audio signal 304 is output to listener 113 via headset 119. Scenario 302 also shows that the AI engine has mixed right audio signals 115 and 203 to create composite right audio signal 306. Composite right audio signal 306 is output to listener 113 via headset 119.

Composite left audio signal 304 and composite right audio signal 306 may be generated by the AI engine based on relative positions of participants 111 and 105 displayed to listener 113 via interface 103 of the videotelephony conference. The composite signals may be generated to achieve a simulated effect of a live, in-person conversation. For example, listener 113 may wish to engage in a private conversation with participant 105. However, listener 113 and participant 105 may not wish to miss any other conversation the occurs with participants 107, 111 or 109.

Scenario 302 shows participant 105 and listener 113 may engage in a private conversation and remain in a general conference room. To facilitate the private conversation between listener 113 and participant 105, the AI engine may adjust audio properties of composite left audio signal 304 and composite right audio signal 306 such that listener 113 perceives a private conversation with participant 105 within a larger room that includes other ongoing conversations (e.g., audio signals generated by participants 107, 111 or 109). the AI engine may provide audio output to participants 107, 111 or 109 that is different from composite left audio signal 304 and composite right audio signal 306 provided to listener 113.

Figure 4:
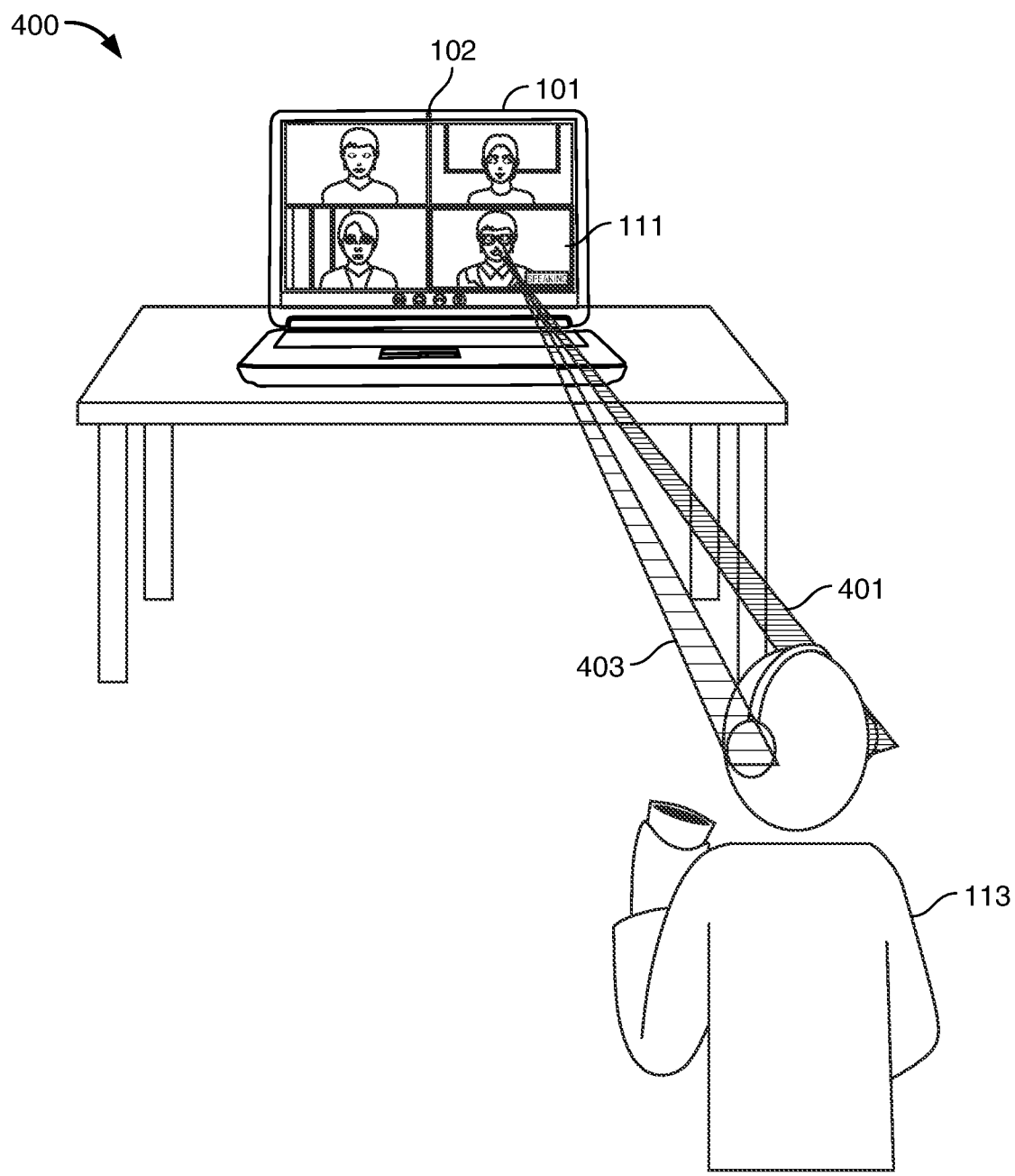
FIG. 4 shows operation of an illustrative system in accordance with principles of the disclosure.

FIG. 4 shows illustrative operational scenario 400. Relative to a position of listener 113 in FIG. 1, in scenario 400 listener 113 has moved away from computer system 101 that is presenting a videotelephony conference within interface 103. Scenario 400 shows that an AI engine may detect that listener 113 has changed an orientation with respect to computer system 101 or interface 103. The AI engine may use camera 405 to capture movement of listener 113.

Based on the changed orientation, the AI engine may dynamically adjust audio signals provided to listener 113. Scenario 400 shows that the AI engine has dynamically generated left audio signal 403 and right audio signal 401. The AI engine may dynamically adjust audio signals 117 and 115 to account for the increased distance between listener 113 and interface 103. The dynamic adjustment may simulate changes that would have been perceived by listener 113 had the conversation with participant 111 been a live, in-person conversation and during the conversation, moved further away from participant 111.

Figure 5:
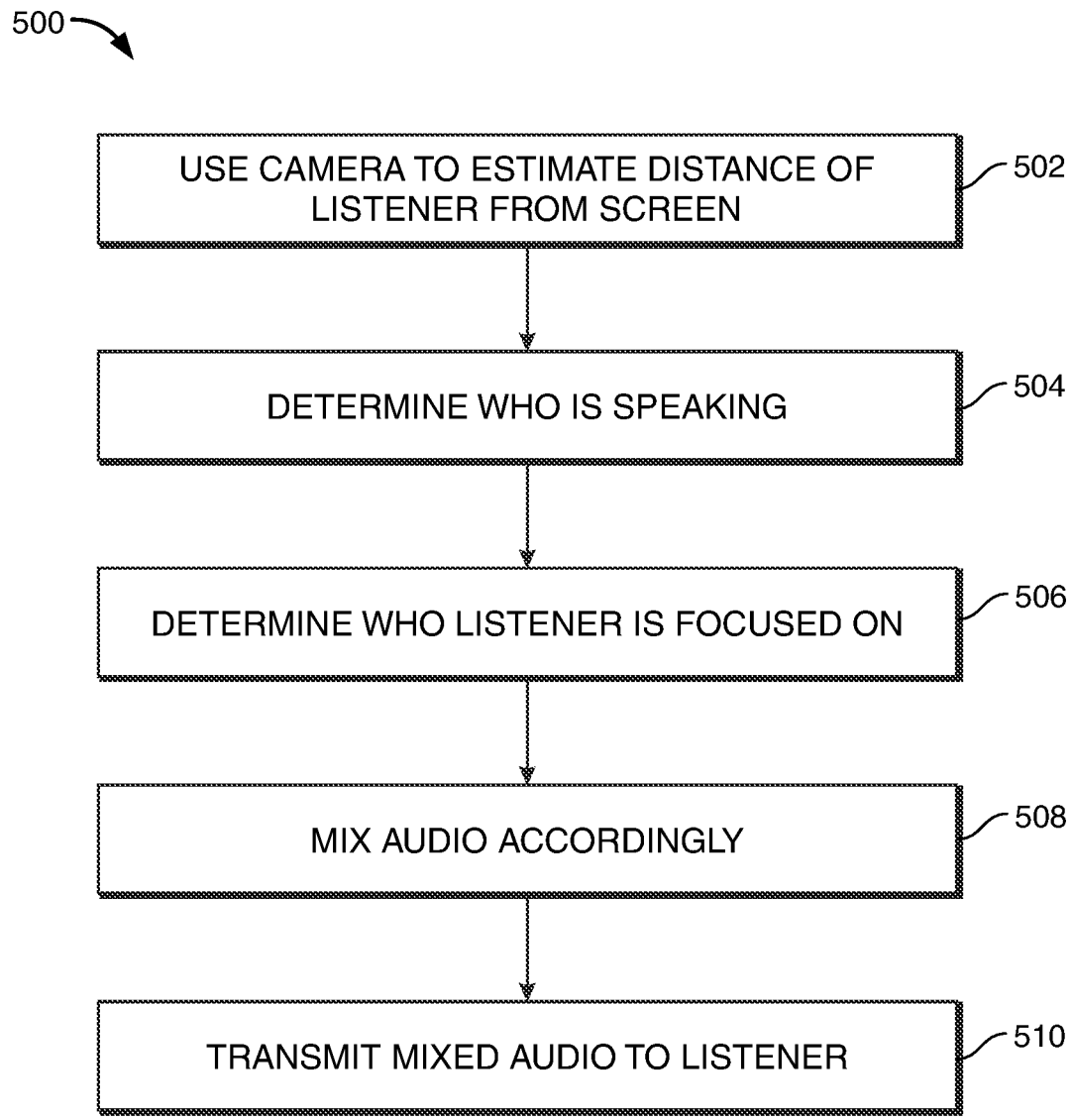
FIG. 5 shows an illustrative process in accordance with principles of the disclosure.

FIG. 5 shows illustrative process 500. Process 500 may be executed by a computer system, an AI engine running on the computer system or as part of a videotelephony conference interface. For illustrative purposes, process 500 will be described as being executed by an AI engine. Process 500 begins at step 502. At step 502, the AI engine uses a camera to estimate a distance separating a listener from a screen that displays an ongoing videotelephony conference.

At step 504, the AI engine determines a current speaker within the ongoing videotelephony conference. At step 506, the AI engine determines if the listener is focused any particular participant in an ongoing videotelephony conference. The listener's focus may be determined based on a selection or conversation analysis.

At step 508, the AI engine may mix capture audio input signals accordingly. The AI engine may mix the audio signals to generate a customized audio output for each of the videotelephony conference participants. At step 510, the AI engine transmits the customized audio output to one or more listeners.

Figure 6:
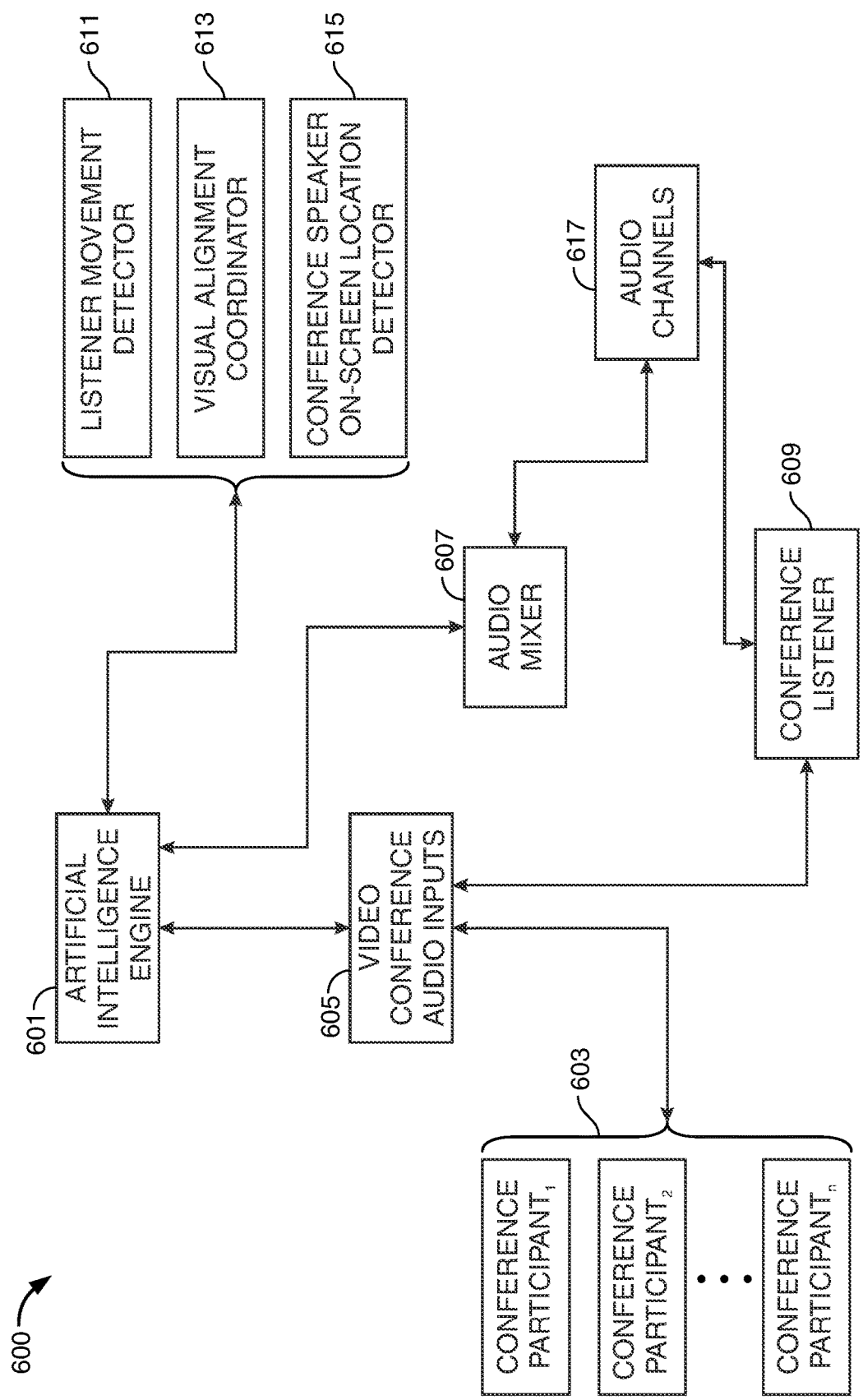
FIG. 6 shows an illustrative system in accordance with principles of the disclosure.

FIG. 6 shows illustrative system 600. System 600 may be used to implement one or more of the functionalities described in connection with FIGS. 1-5. System 600 includes AI engine 601. AI engine 601 may capture audio inputs 605 from participants 603 in a videotelephony conference. AI engine 601 may transmit the captured audio signal to audio mixer 607. Audio mixer 607 may combine captured audio inputs 607 into one or more audio channels 617. Each of audio channels 617 may be a composite of two or more of captured audio inputs 607.

Audio mixer 607 may adjust any suitable property of the captured audio signals. AI engine 601 may issue instructions to audio mixer 607. AI engine 601 may issue instructions to audio mixer 607 based on data captured by listener movement detector 611. Listener movement detector 611 may be a camera or other motion sensing device that captures movement of listener 609 with response to a videotelephony conference interface or one or more of participants 603.

Visual alignment coordinator 613 may align a speaker based on one or more audio channels generated for a listener. Visual alignment coordinator 613 may arrange and rearrange conference participants within a conference interface. Visual alignment coordinator 613 may arrange the participants to correspond to the audio channels output to the listener. For example, if the audio channel simulates a private conversation between a participant and the listener, visual alignment coordinator 613 may enlarge a video image of the participant relative to other participants. If the audio channel simulates, relative to other participants, a far distance between a participant and the listener, visual alignment coordinator 613 may decrease a size of a video image of the participant relative to other participants.

AI engine 601 may issue instructions to audio mixer 607 based on data captured by on-screen location detector 615. On-screen location detector 615 may monitor a location of a participant that is generating audio input during a videotelephony conference. Based on the speaker location, AI engine 601 may issue instructions to audio mixer 607. Each participant may have a customized visual arrangement of other conference participants. The customized arrangement may be determined by visual alignment coordinator 613.

AI engine 601 may utilize data from visual alignment coordinator 613 to issue instructions to audio mixer 607 and generate audio channels for a listener based on the listener's customized visual arrangement of other conference participants.

For example, audio mixer 607 may adjust volume level, frequency content, dynamics and panoramic position of captured audio inputs 605. Audio channels 617 created by AI engine 601 using audio mixer 607 are provided as audio outputs to videotelephony conference listener 609.

Thus, methods and apparatus for a VIDEO AND AUDIO SPLITTING THAT SIMULATES IN-PERSON CONVERSATIONS DURING REMOTE CONFERENCING are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for simulating an in-person audio conversation during a videotelephony conference, the method comprising:
    detecting a first audio input provided by a first participant;
    detecting a second audio input provided by a second participant;
    positioning the first participant in a first region of a videotelephony conference interface presented to a listener;
    positioning the second participant in a second region of the videotelephony conference interface; and
    adjusting an audio output provided to the listener based on positions of the first and second participants in the videotelephony conference interface, the adjusting further comprising:
        dynamically mixing a first audio output based on the first and second audio inputs;
        dynamically mixing a second audio output based on the first and second audio inputs;
        outputting the first audio output to the listener through a first audio channel; and
        outputting the second audio output to the listener through a second audio channel; and
    the method further comprising:
        detecting a third audio input from the listener; and
        in response to the third audio input, remixing the first and second audio outputs.

2. The method of claim 1 the adjusting comprising outputting the first audio input through a first audio channel and the second audio input through a second audio channel.

3. The method of claim 1 the adjusting comprising outputting the first audio input through a first audio channel at a first volume and the second audio input through a second audio channel at a second volume.

4. The method of claim 3 wherein:
    the first volume is based on the positioning of the first participant in the first region; and
    the second volume is based on the positioning of the second participant in the second region.

5. The method of claim 1 wherein the adjusting of the audio output is based on a detected position of the listener with respect to the videotelephony conference interface.

6. The method of claim 5 wherein the adjusting is further based on an estimated distance of the listener from a display presenting the videotelephony conference interface.

7. The method of claim 6 wherein the adjusting is further based on an orientation of the listener with respect to the display.

8. An artificial intelligence ("AI") engine for dynamically adjusting audio output streamed to a listener during a videotelephony conference, the AI engine comprising machine executable instructions stored in a non-transitory memory of a computer system and, when executed by a processor on the computer system:
    capture audio input from two or more participants in the videotelephony conference;
    based on a selection provided by a listener, mix the audio input to generate a first audio output and a second audio output;
    present the first audio output to the listener through a first audio channel;
    present the second audio output to the listener through a second audio channel;
    mix the captured audio input to generate the first audio output and the second audio output that focus on a target audio input captured from a target participant;
    mirror the audio output generated for the target participant that focuses the listener on a target location of a screen displaying the two or more participants; and
    generate the first audio output and the second audio output that focus on the target audio input captured from the target participant by presenting the target audio input to the listener via the first audio channel and audio input captured from any of the other two or more participants via the second audio channel.

9. The AI engine of claim 8 further comprising machine executable instructions stored in the non-transitory memory that when executed by the processor on the computer system, align a visual position of the two or more participants presented to the listener based on a proportion of the audio input captured from each of the two or more participants in the first audio output or the second audio output.

10. The AI engine of claim 8 further comprising machine executable instructions stored in the non-transitory memory that when executed by the processor on the computer system, mix the audio input to generate the first audio output and the second audio output that minimize, within the first audio output and the second audio output, a target audio input captured from a target participant.

11. The AI engine of claim 8 further comprising machine executable instructions stored in the non-transitory memory that when executed by the processor on the computer system, mix the captured audio input to maximize, within the first audio output and the second audio output, a target audio input captured from a target participant.

12. The AI engine of claim 8 wherein the selection provided by the listener comprises selecting at least one of the two or more participants to engage in a one-on-one conversation.

13. An artificial intelligence ("AI") engine for dynamically adjusting audio output provided to a listener during a videotelephony conference, the AI engine comprising machine executable instructions stored in a non-transitory memory of a computer and, when executed by a processor on the computer system:
    capturing a first audio input from a first participant in the videotelephony conference;
    capturing a second audio input from a second participant in the videotelephony conference;
    presenting a first mix of the first audio input and the second audio input to the listener over a first audio channel; and
    presenting a second mix of the first audio input and the second audio input to the listener over a second audio channel;
wherein the first mix and the second mix are generated by the AI engine based on relative positions of the first and second participants displayed to the listener via a user interface of the videotelephony conference;

receiving a selection of the first participant;
in response to the selection of the first participant, adjusting the first mix and the second mix such that the first audio input captured from the first participant dominates the first mix presented over the first audio channel and the second mix presented over the second audio channel;
receiving a selection of the listener by the second participant; and
in response to the selection of the second participant, adjusting the first mix and the second mix such that the second audio input captured from the second participant dominates the first mix presented to the listener over the first audio channel and the second mix presented to the listener over the second audio channel.

* * * * *